(12) United States Patent
Nakadaira (10) Patent No.: US 7,885,353 B2
(45) Date of Patent: Feb. 8, 2011

(54) SPREAD SPECTRUM BLOCK CONTROL APPARATUS AND SPREAD SPECTRUM CLOCK GENERATING APPARATUS

(75) Inventor: Masao Nakadaira, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 1012 days.

(21) Appl. No.: 11/712,977

(22) Filed: Mar. 2, 2007

(65) Prior Publication Data

US 2007/0206659 A1   Sep. 6, 2007

(30) Foreign Application Priority Data

Mar. 3, 2006   (JP)   ............... 2006-058304

(51) Int. Cl.
*H03C 3/00*   (2006.01)
*H03K 7/06*   (2006.01)
*H04L 27/12*   (2006.01)

(52) U.S. Cl. ................ 375/303; 327/114; 327/291; 327/298

(58) Field of Classification Search ............. 375/354, 375/371, 373, 37, 295, 302, 303, 374; 327/100, 327/141, 144, 151, 291, 298, 114

See application file for complete search history.

(56) References Cited

U.S. PATENT DOCUMENTS 7,346,095 B1 * 3/2008 Hattori ............... 375/130
2004/0252751 A1 * 12/2004 Ogasawara ............ 375/130

FOREIGN PATENT DOCUMENTS

JP   2005-004451 A   1/2005

* cited by examiner

*Primary Examiner*—David C Payne
*Assistant Examiner*—James M Perez
(74) *Attorney, Agent, or Firm*—Foley & Lardner LLP (57) ABSTRACT

Disclosed is an SSC controller that exercises control to supply a control signal to a phase interpolator which receives an input clock signal and varies the phase of an output clock signal in accordance with the control signal, and to frequency-modulate the output clock signal. In an SSC controller, a counting operation control circuit outputs a counting operation control signal that controls count enable and disable. A p-counter receives a frequency-divided clock signal from a frequency divider and counts the signal when the counting operation control signal from the counting operation control circuit indicates count enable. Upon counting up to a predetermined first value, the counting operation control circuit generates a first output signal and sets its count value to zero. When the counting operation control signal indicates count disable, the p-counter stops counting. An up/down counter receives the first output signal from the p-counter and counts this signal up and down between a predetermined initial value (=0) and a predetermined second value. On the basis of count values from the two counters, a controller outputs the phase control signal to the phase interpolator. The counting operation control circuit, which receives the count values from the two counters and is supplied with a control signal from an SSC control terminal, sets the counting operation control signal to a value indicative of count disable when the supplied control signal indicates count disable and both of the count values from the two counters are at their initial values (=0).

16 Claims, 8 Drawing Sheets

SPREAD SPECTRUM BLOCK CONTROL APPARATUS AND SPREAD SPECTRUM CLOCK GENERATING APPARATUS

FIELD OF THE INVENTION

This invention relates to a clock generating circuit and, more particularly, to a spread spectrum clock generator.

BACKGROUND OF THE INVENTION

When a clock generator in an electronic device generates a single frequency, emission of this frequency and higher harmonics increases. For this reason, use is made of a spread spectrum clock generator (SSCG) that reduces the peak of unnecessary emissions by frequency modulation and diminishes EMI (electromagnetic interference).

Operating frequencies have risen in recent years and the problem of bit-to-bit skew in parallel buses has become more conspicuous. This has led to the spread of serial interfaces that are free of bit-to-bit skew, and such interfaces have come to be employed also in personal computers in general use. For example, SATA (Serial ATA) is used as the interface standard between a hard disk and a CPU. SATA is a serial interface standard in which the first-generation communication speed is 1.5 Gbps and incorporates a spread spectrum clock (SSC) standard as an EMI countermeasure in order to be used in personal computers and the like.

In general, a PLL (phase-locked loop) using a pulse-swallow frequency divider is employed as an SSCG. However, an SSCG that employs a phase interpolator and a controller and not a pulse-swallow frequency divider and VCO (voltage-controlled oscillator) also is known in the art (see Patent Document 1).

Further, there is need for an operation in which, during the operation of an SSC (spread spectrum clock), the SSC function is turned off temporarily and then is turned on again upon elapse of a prescribed period of time. Since it is required that this operation also be changed over reversibly, it is necessary that the transition between the on and off states of the SSC function be performed smoothly. Such a function is not available in the conventional SSCG, a transient frequency change is produced at the time of changeover and an interruption in communication occurs.

Figure 5:
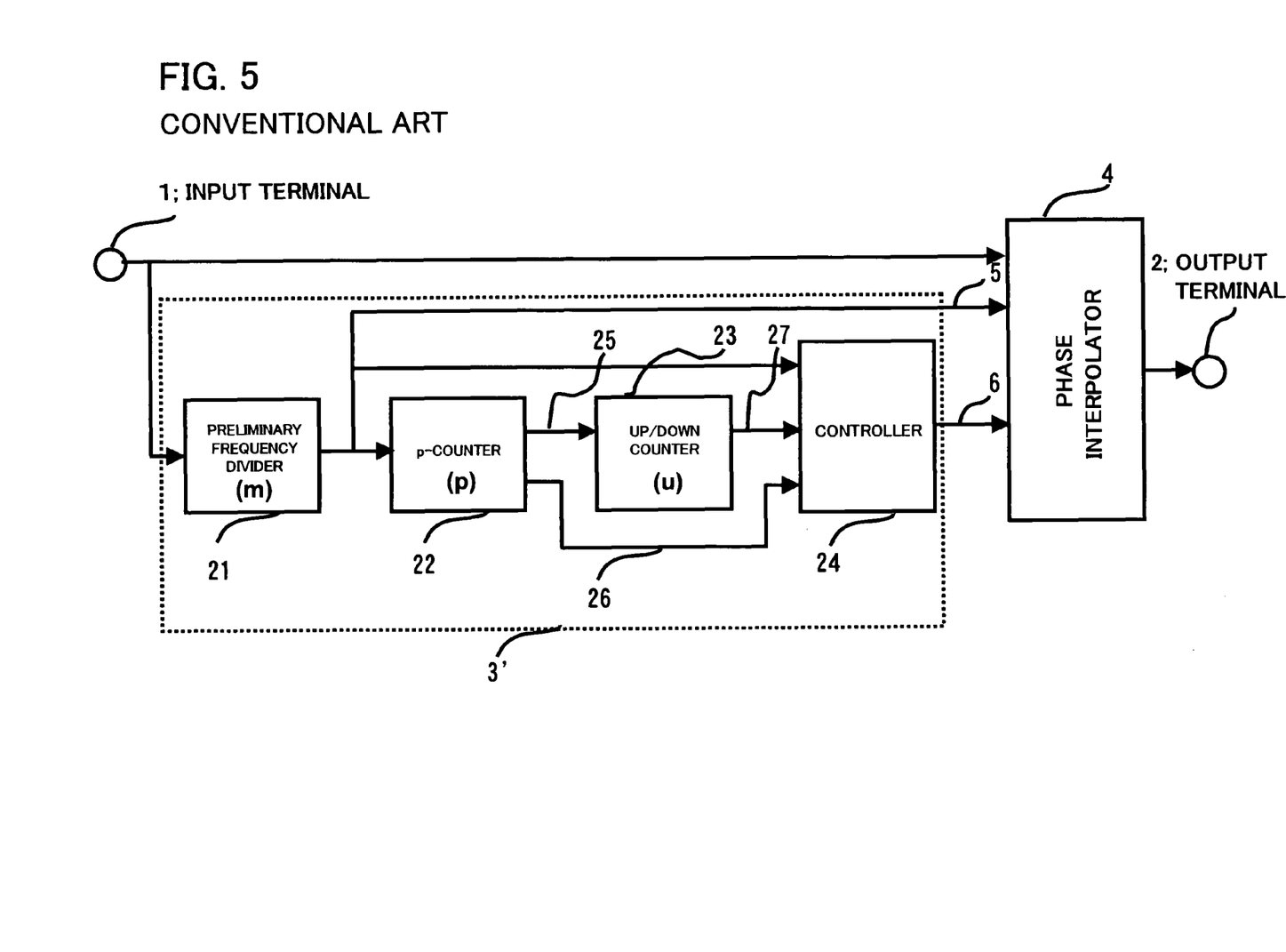
FIG. 5 is a block diagram illustrating the configuration of a third example in Patent Document 1.

Patent Document 1 filed by the present applicant discloses an example (see FIG. 4 and the third example in Patent Document 1) that is well suited to the SSC standard (degree of modulation: 0 to −5000 ppm; modulation frequency: 30 to 33 kHz) of SATA. For the details, reference should be had to Patent Document 1. A brief description will now be set forth.

Figure 6:
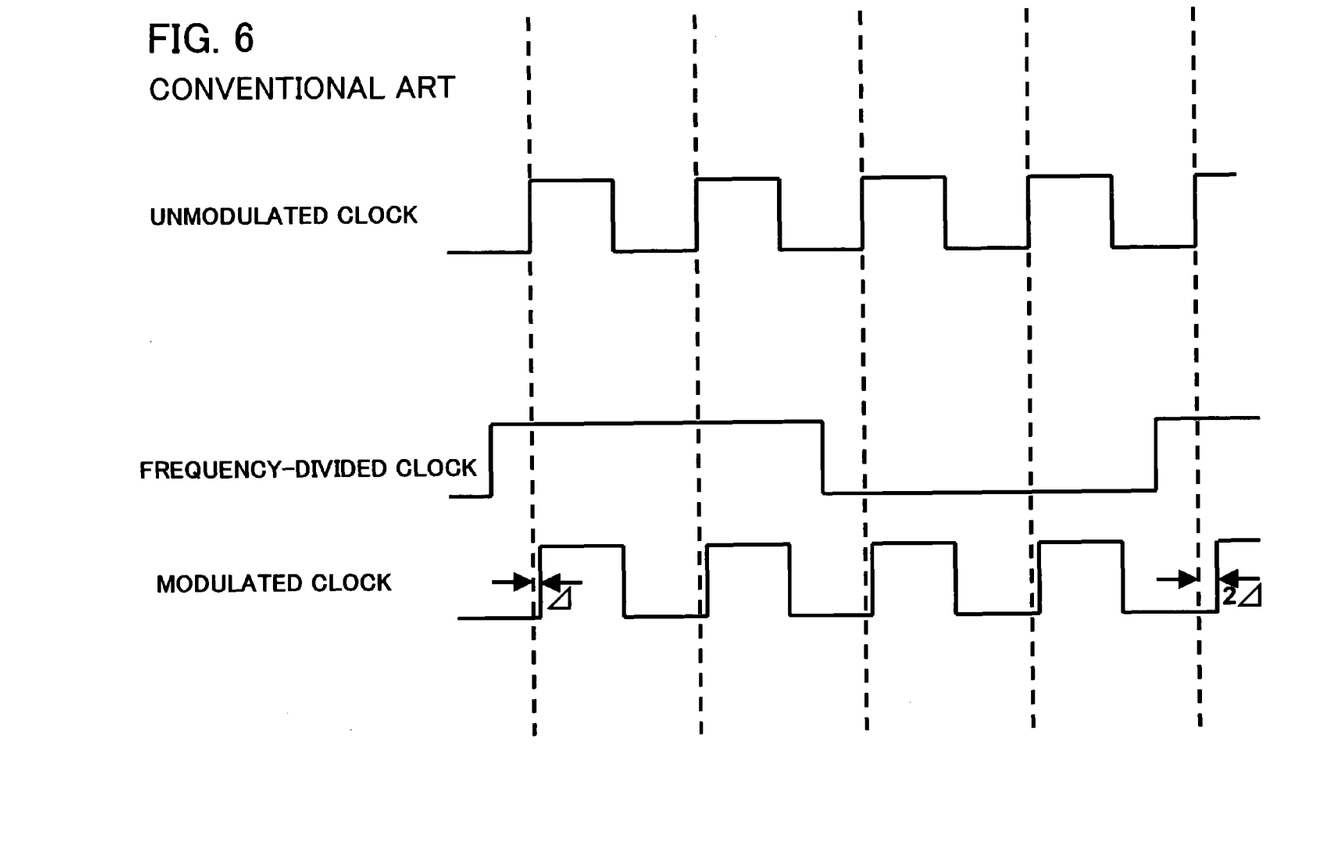
FIG. 6 is a diagram illustrating an output clock waveform in FIG. 5.

In the SCCG described in Patent Document 1, as illustrated in FIG. 5, a down signal 6 is supplied to a phase interpolator 4. The frequency of occurrence of a delay Δ of a prescribed amount with respect to a clock signal that is supplied to an input terminal 1 is controlled. As illustrated in FIG. 6, a modulated clock signal is output from an output terminal 2, thereby implementing an SSCG suited to a standard referred to as "downspread".

In Patent Document 1, the phase step of the phase interpolator 4 in FIG. 5 is assumed to be $1/64$ (resolution N=64, period $T_0$ of the input clock signal=$1/64$ of $1/1.5$ GHz holds) and the frequency dividing ratio of a preliminary frequency divider 21 is assumed to be 4. A conditional equation for meeting the SATA standard is as follows:

$$1500/0.033 \leq 2 \times m \times p \times u \leq 1500/0.03 \quad (1)$$

With regard to a count p in a p-counter 22 and a count u in an up/down counter 23, a value that satisfies this equation is assumed to be 77, and the modulation frequency is assumed to be 31.62 Hz.

The value u in the up/down counter 23 is updated whenever the p-counter 22 counts 77 times. Based upon the combination of the value in p-counter 22 and the value in up/down counter 23, a controller 24 generates the down signal 6 that retards the phase of the output clock signal of phase interpolator 4.

The number n of logical "1"s of down signal 6 within a reference number k (=m×p) of periods is successively incremented, the frequency of occurrence of phase delay Δ of the phase step $1/64$ (resolution N=64) of the phase interpolator 4 is raised, and the value u in the up/down counter 23 is counted up successively from 0. When the count becomes 77, n is made 77 and the maximum modulation is applied to the clock output from the output terminal 2. The value u in up/down counter 23 is subsequently counted down and n is successively decremented, thereby changing the average frequency f in the reference number k (=m×p) of periods.

If the phase step of the phase interpolator 4 is $1/N$ (=$1/64$) of one period $T_0$ of the clock signal at the input terminal and the average period of the clock signal when the number of down signals 6 in the reference number k of periods is represented by $T_{<average>}$, then we have $k \times T_{<average>} = k \times T_0 + (n/N) \times T_0$ and the average frequency $f_{<average>}$ is $$f_{<average>} = k / [k \times T_0 + (n/N) \times T_0]$$
$$= (1/T_0) \times (k \times N) / (k \times N + n)$$

Figure 7:
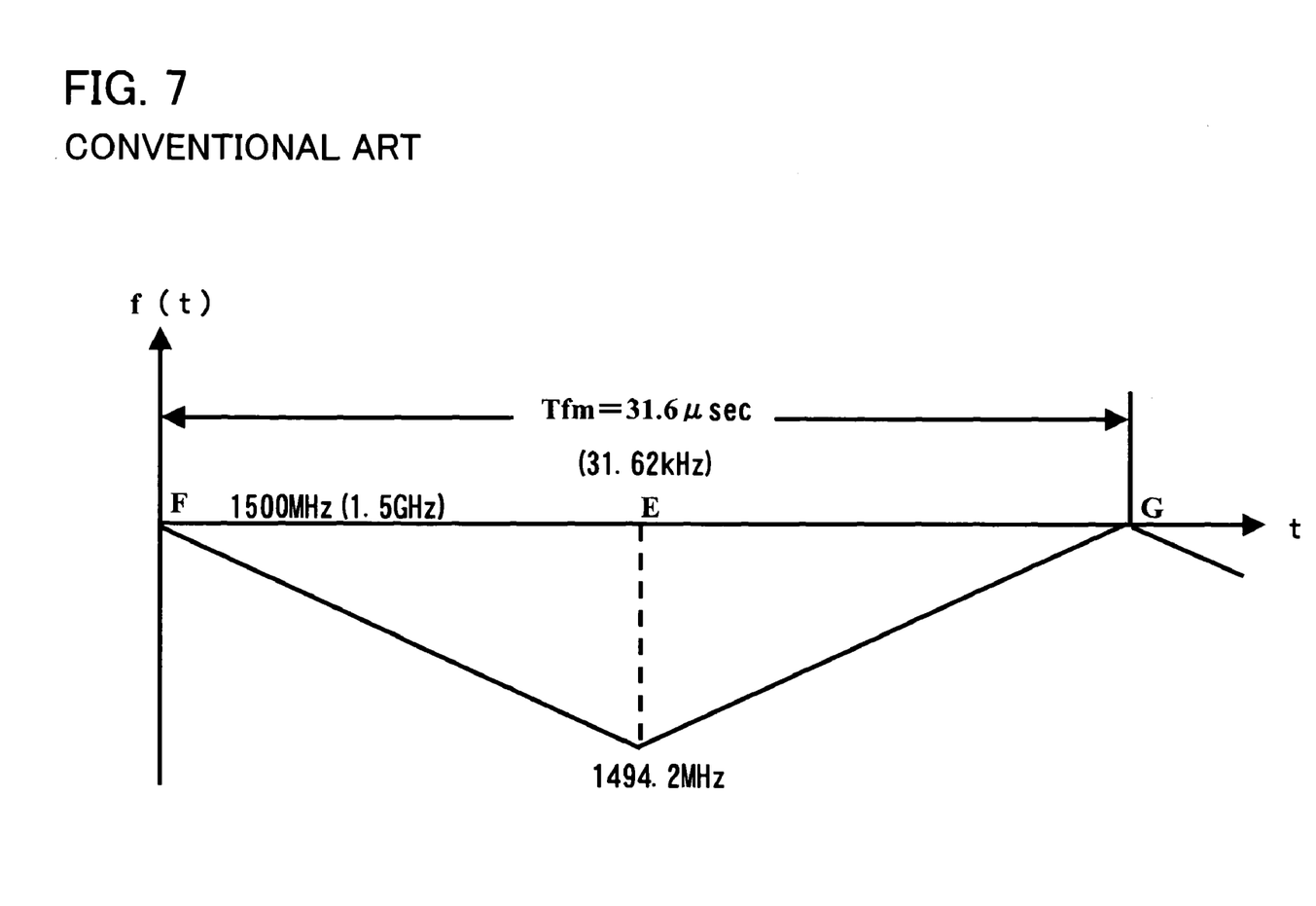
FIG. 7 is a diagram illustrating a modulation waveform in the third example of Patent Document 1.

As illustrated in FIG. 7, the modulation waveform according to the above-mentioned combination is that obtained by modulation at a modulation frequency of 31.62 kHz. A single modulation period Tfm is given by $2 \times m \times p \times u \times T_0$, and we have Tfm=31.6 us (micro second) from m=4, p=u=77, 1.5 GHz=$1/T_0$. That is, this is a triangular wave in which the maximum modulation frequency is 1500 MHz and the minimum modulation frequency is 1494.2 MHz.

[Patent Document 1] Japanese Patent Kokai Publication No. JP-P2005-4451A (Pages 5 to 9, 11 to 13, FIGS. 1, 3 and 4)

With the conventional SSCG described in Patent Document 1, however, the SSC function is implemented by the preliminary frequency divider 21, p-counter 22, up/down counter 23, controller 24 and phase interpolator 4, and the SSCG is not equipped with an SSC-function on/off changeover circuit.

Consequently, with the conventional SSCG, it is not possible to implement an operation in which, during the operation of an SSC, the SSC function is turned off temporarily and then is turned on again upon elapse of a prescribed period of time. Further, implementing a function whereby the transition between the on and off states of the SSC function is performed smoothly is a problem.

SUMMARY OF THE DISCLOSURE

Accordingly, the present invention seeks to solve the aforementioned problems and has the structure set forth below.

In the apparatus according to the present invention, a block to which count values and a control signal are input for controlling counter operation or performing clock control is added on in front of a p-counter, thereby enabling on/off control of the SSC function and making it possible to achieve a smooth transition between on and off without a transient change in frequency.

The present invention provides a spread spectrum clock control apparatus for exercising control to supply a phase control signal to a phase interpolator which receives an input clock signal and varies the phase of an output clock signal in accordance with the phase control signal, and to frequency modulate the output clock signal. The apparatus receives the input clock signal, counts the input clock signal by a counter, generates the phase control signal based upon the result of the count and receives a control signal for on/off controlling an SSC (spread spectrum clock) function. If the control signal indicates SSC-function ON, the counting operation is performed by the counter. If the control signal takes on a value indicating SSC-function OFF, control is exercised to halt the counting operation of the counter at the moment the count value in the counter reaches a predetermined value. In the present invention, a circuit for exercising control so as to halt the counting operation of the counter performs either control for halting supply of the clock signal to the counter or control for setting the signal that controls the counting operation of the counter to count disable at the moment the count value in the counter reaches a predetermined value when the control signal has become the value indicating SSC-function OFF.

More specifically, an apparatus according to one aspect of the present invention is a spread spectrum clock control apparatus for exercising control to supply a phase control signal to a phase interpolator which receives an input clock signal and varies the phase of an output clock signal in accordance with the phase control signal, and to frequency-modulate the output clock signal, the apparatus comprising: a counting operation control circuit for outputting a counting operation control signal that controls a counting operation and halting of the counting operation; a first counter which, when the counting operation control signal from the counting operation control circuit indicates the counting operation, receives and counts the input clock signal and, when the signal has been counted up to a predetermined first value, outputs a first output signal and sets the count to an initial value, and which, when the counting operation control signal indicates halting of the count, halts the counting operation; a second counter, which receives the first output signal from the first counter, for counting this signal up and down between a predetermined initial value and a predetermined second value; and a controller for outputting the phase control signal to the phase interpolator based upon count values from the first and second counters; wherein the counting operation control circuit receives a control signal for on/off controlling an SSC (spread spectrum clock) function as well as the count values from the first and second counters, sets the counting operation control signal to a value indicating count disable when the control signal indicates SSC-function OFF and, moreover, both of the count values from the first and second counters are initial values, and sets the counting operation control signal to a value indicating count enable at all other times.

In the present invention, a frequency divider circuit which receives the input clock signal is provided in front of the first counter, and a frequency-divided clock signal from the frequency divider circuit is supplied to the first counter. In the present invention, the controller receives the frequency-divided clock from the frequency divider circuit and the count values from the first and second counters as inputs, and outputs the phase control signal to the phase interpolator based upon the count values from the first and second counters at a timing stipulated by the frequency-divided clock.

An apparatus according to one aspect of the present invention is a spread spectrum clock control apparatus for exercising control to supply a phase control signal to a phase interpolator which receives an input clock signal and varies the phase of an output clock signal in accordance with the phase control signal, and to frequency modulate the output clock signal, the apparatus comprising: a first counter for receiving and counting the input clock signal and, when the signal has been counted up to a predetermined first value, outputting a first output signal and setting the count to an initial value; a second counter, which receives the first output signal from the first counter, for counting this signal up and down between a predetermined initial value and a predetermined second value; a controller for outputting the phase control signal to the phase interpolator based upon count values from the first and second counters; and a clock control circuit for controlling supply and halting of the clock signal to the first counter; wherein the clock control circuit receives a control signal for on/off controlling an SSC (spread spectrum clock) function as well as the count values from the first and second counters, supplies the clock signal to the first counter when the control signal indicates SSC-function ON, and halts supply of the clock signal to the first counter, at the moment both of the count values from the first and second counters take on initial values, when the control signal indicates SSC-function OFF.

In the present invention, a frequency divider circuit which receives the input clock signal is provided in front of the clock control circuit, and a frequency-divided clock signal that is output from the frequency divider circuit is supplied to the clock control circuit. When the control signal indicates SSC-function ON, the clock control circuit supplies the frequency-divided clock to the first counter. When the control signal indicates SSC-function OFF, the clock control circuit halts the supply of the frequency-divided clock to the first counter at the moment both of the count values from the first and second counters take on initial values.

In the present invention, the controller receives the frequency-divided clock from the frequency divider circuit and the count values from the first and second counters as inputs, and outputs the phase control signal to the phase interpolator based upon the count values from the first and second counters at a timing stipulated by the frequency-divided clock.

In the present invention, the phase control signal includes a down signal that retards the phase of the output clock signal. Alternatively, the phase control signal includes a down signal that retards the phase of the output clock signal and/or an up signal that advances the phase of the output clock signal. The present invention provides a spread spectrum clock generating apparatus having a phase interpolator receiving an input clock signal and varying the phase of an output clock signal in accordance with a phase control signal; and a spread spectrum clock control unit for supplying the phase control signal to the phase interpolator and frequency-modulating the output clock signal; wherein the spread spectrum clock control apparatus of the present invention set forth above is provided as the spread spectrum clock control unit.

The meritorious effects of the present invention are summarized as follows. In accordance with the present invention, it is possible to on/off control an SSC function. Moreover, the transition between the on and off states of the SSC function can be performed smoothly without a transient change in frequency.

In accordance with the present invention, it is possible to reduce unnecessary power consumption when the SSC function is turned off.

Other features and advantages of the present invention will be apparent from the following description taken in conjunction with the accompanying drawings, in which like reference characters designate the same or similar parts throughout the figures thereof.

PREFERRED MODES OF THE INVENTION

The present invention will be described in detail with reference to the accompanying drawings.

Figure 1:
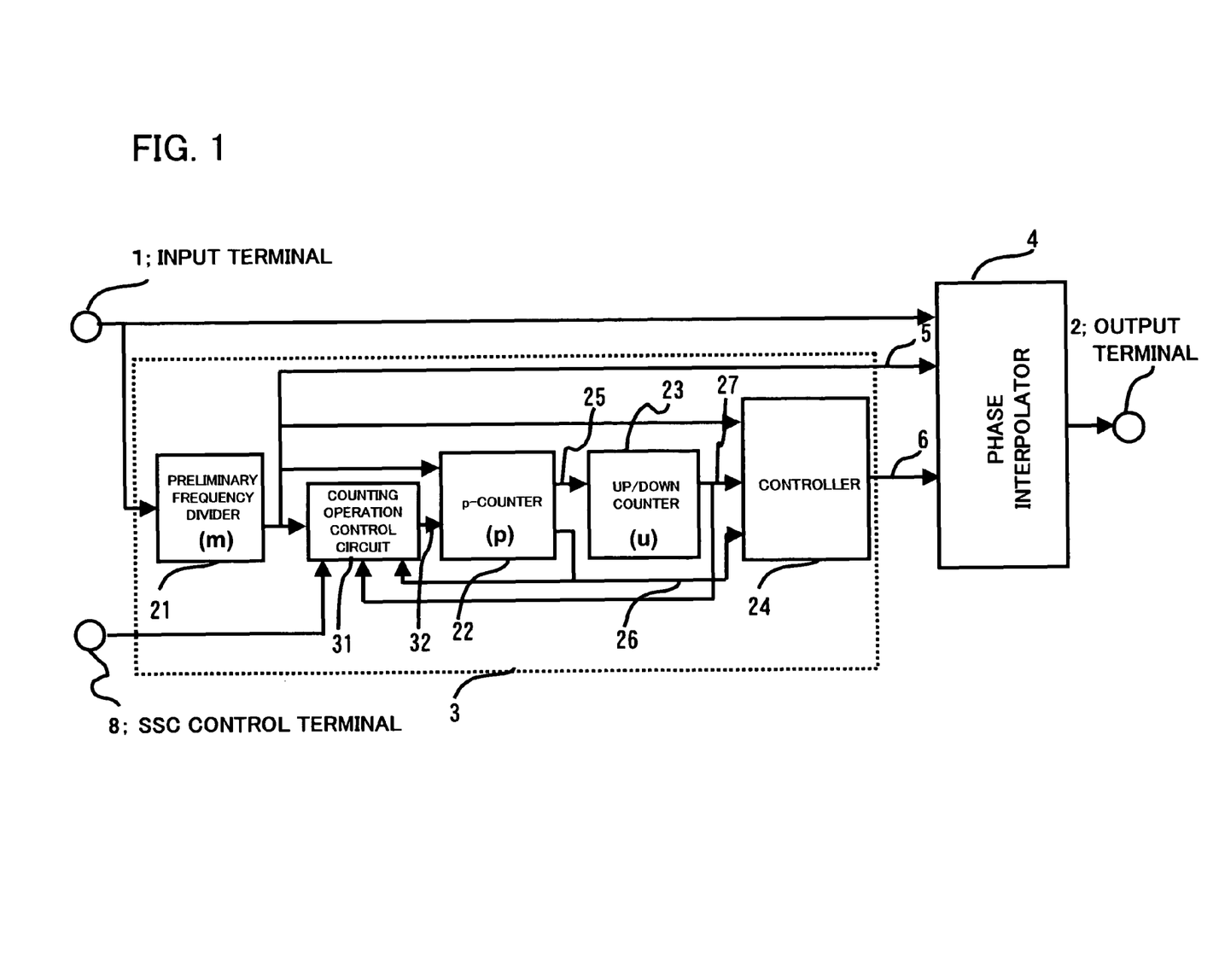
FIG. 1 is a block diagram illustrating the configuration of a first example of the present invention.

Referring to FIG. 1, in the present invention, a phase interpolator 4 receives an input clock signal and varies the phase of an output clock signal in accordance with a phase control signal that is for varying and controlling phase. An SSC controller 3, which generates the control signal applied to the phase interpolator 4, is provided with a counting operation control circuit 31 for outputting a counting operation control signal 32 that controls count enable and disable. When the counting operation control signal 32 from the counting operation control circuit 31 is indicative of count enable, a p-counter 22 counts the clock signal. When the p-counter 22 counts up to a predetermined first value, the counter produces a first output signal 25 and sets the count value to zero. When the counting operation control signal 32 indicates disable, the counting operation is halted. An up/down counter 23 receives the first output signal 25 from the p-counter 22 and counts this signal up and down between a predetermined initial value (=0) and a predetermined second value. A controller 24 outputs a phase control signal 6 to the phase interpolator 4 based upon the count values 26 and 27 from the counters 22 and 23, respectively.

The count values 26 and 27 from the counters 22 and 23, respectively, are supplied to the counting operation control circuit 31, which is also supplied from a terminal 8 with a control signal that turns an SSC (spread spectrum clock) function on and off. When this control signal indicates SSC-function OFF, counting is enabled until both of the count values 26 and 27 from the counters 22 and 23 take on initial values (=0). At the moment both of the count values 26 and 27 from the counters 22 and 23 take on initial values (=0), the counting operation control signal 32 is set to a value indicative of count disable.

In the present invention, the SSC controller 3 is such that a frequency divider circuit 21 which receives the input clock signal is provided ahead of the p-counter 22, and a frequency-divided clock signal 5 from the frequency divider circuit 21 is supplied to the first counter 22. The controller 24 receives the frequency-divided clock 5 from the frequency divider circuit 21 and the respective count values 26 and 27 from the counters 22 and 23 as inputs, and outputs the phase control signal 6 to the phase interpolator 4 based upon the count values 26 and 27 from the counters 22 and 23 at a timing stipulated by the frequency-divided clock.

Figure 2:
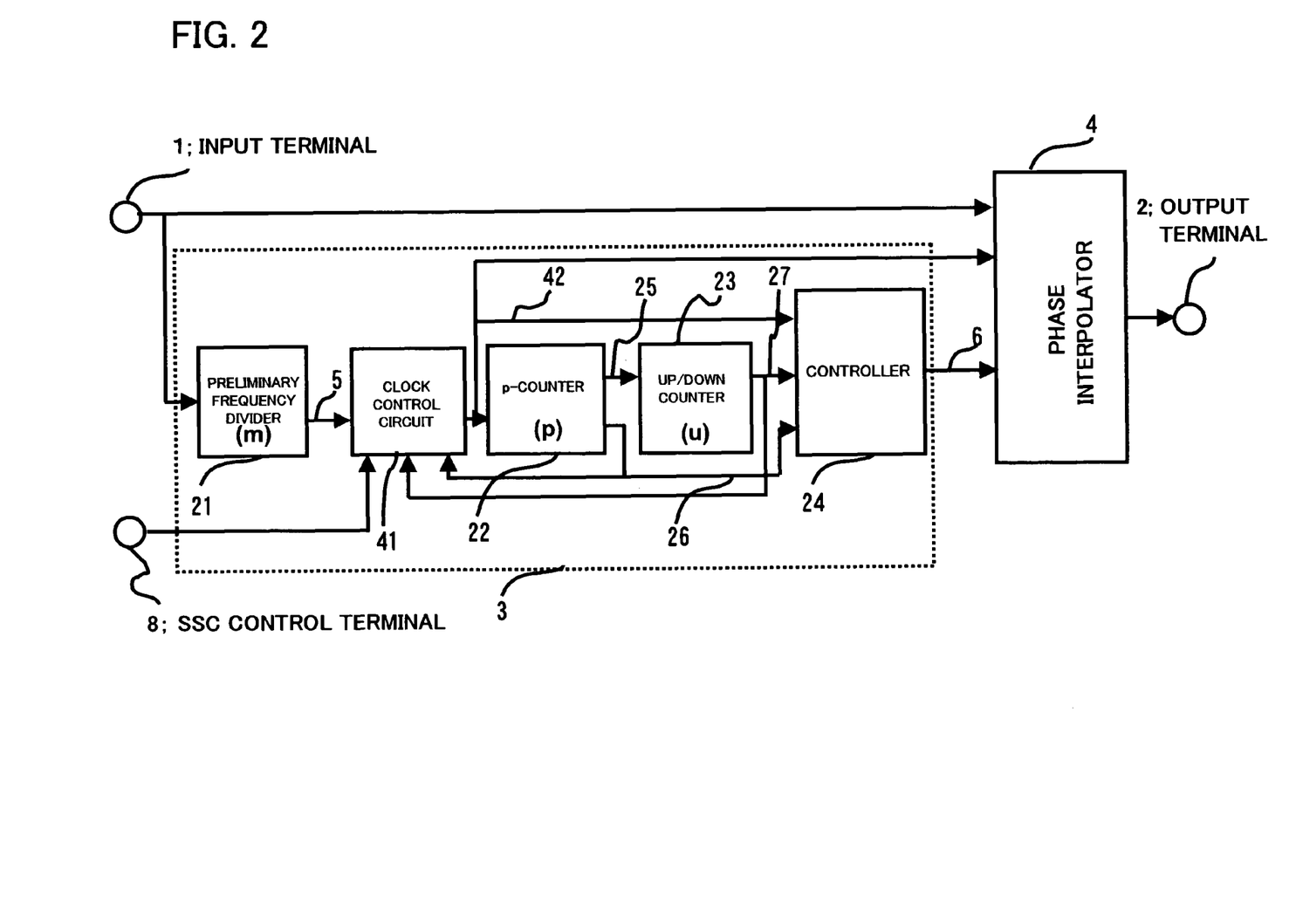
FIG. 2 is a block diagram illustrating the configuration of a second example of the present invention.

In accordance with another form of the present invention, the SSC controller 3 is provided with a clock control circuit 41 for controlling supply and halting of the clock signal to the p-counter 22. The p-counter 22 receives and counts the clock signal supplied from the clock control circuit 41. When the p-counter 22 counts up to a predetermined first value, the p-counter 22 outputs the first output signal 25 and sets the count value to an initial value (=0). The up/down counter 23 receives the first output signal 25 from the p-counter 22 and counts this signal up and down between a predetermined initial value (=0) and a predetermined second value. On the basis of the count values 26 and 27 from the counters 22 and 23, respectively, the controller 24 outputs the phase control signal 6 to the phase interpolator 4. In the present invention, the SSC controller 3 is such that the frequency divider circuit 21 which receives the input clock signal is provided in front of the clock control circuit 41. The clock control circuit 41 receives the count values 26 and 27 from the counters 22 and 23 as inputs and is also supplied from a terminal 8 with a control signal that turns the SSC function on and off. When this control signal indicates SSC-function OFF, supply of the frequency-divided clock signal 5 from the frequency divider circuit 21 to the p-counter 22 is halted at the moment the count values from the counters 22 and 23 take on the initial values. When the control signal changes from SSC-function OFF to SSC-function ON, the counters 22 and 23 both start counting up from their initial values. A more detailed description of the examples will now be set forth.

FIG. 1 is a block diagram illustrating the configuration of the first example of the present invention. As shown in FIG. 1, this example is obtained by adding on a counting operation control circuit 31 in front of the p-counter 22 in the configuration shown in FIG. 5. Further, an SSC control terminal 8 is added on. The control signal (for exercising control to turn the SSC function on and off) from the SSC control terminal 8 is supplied to the counting operation control circuit 31. More specifically, the SSC controller 3 includes:

a preliminary frequency divider 21 that receives the input clock signal from terminal 1 and outputs a clock signal which has been frequency-divided by m;

the counting operation control circuit 31;

the p-counter 22 that counts the frequency-divided clock of the preliminary frequency divider 21 starting from the initial value zero and, when the count reaches the value p, outputs the control signal 25 and sets the count value to the initial value of zero;

the up/down counter 23 that receives the output signal 25 from the p-counter 22, counts up the signal from the initial value of zero and, when the count reaches the value u, counts down the signal to the initial value zero; and the controller 24 that receives the frequency-divided clock signal (timing signal) from the preliminary frequency divider 21, the count value 26 from the p-counter 22 and the count value 27 from the up/down counter 23, and generates the down signal 6.

In this example, the counting operation control circuit 31 receives the control signal (referred to as an "SSC control signal" below) from the SSC control terminal 8, the count value 26 from the p-counter 22 and the count value 27 from the up/down counter 23, outputs the counting operation control signal 32 to the p-counter 22 and controls the operation of the p-counter 22 (count enable) and the halting of this operation (count disable). More specifically, the counting operation control circuit 31 receives as inputs the control signal from the SSC control terminal 8, the count value 26 from the p-counter 22 and the count value 27 from the up/down counter 23, and outputs logical "0" (count disable) as the counting operation control signal 32, only when both of the count values 26 and 27 are at the initial values of zero and the control signal from the SSC control terminal 8 is indicative of disable.

The counting operation control circuit 31 outputs logical "1" (count enable) as the counting operation control signal 32 in all other states.

Figure 3:
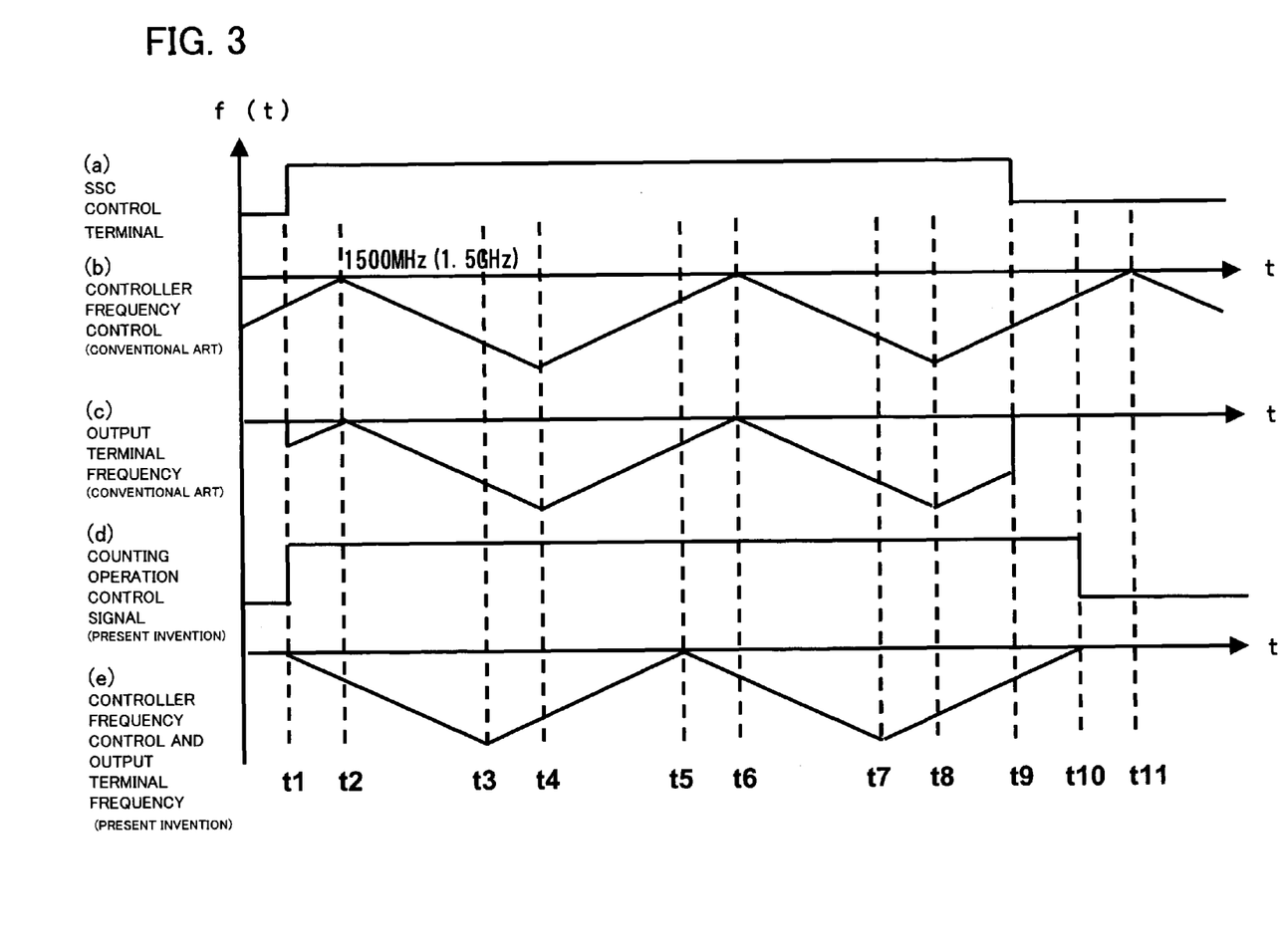
FIG. 3 is a waveform diagram illustrating useful in describing the operation of the first example.

A modulated waveform of the kind illustrated in (e) of FIG. 3 is obtained by the control described above. FIG. 3 is a timing diagram useful in describing the operation of this example. (a) of FIG. 3 represents the SSC signal that is applied to terminal 8. SSC-function ON is represented when the SSC control signal is at a high level (logical "1"), and SSC-function OFF is represented when the SSC control signal is at a low level (logical "0"). (b) of FIG. 3 indicates frequency control by the controller 24 of the SSCG apparatus according to the conventional art illustrated in FIG. 5. As illustrated in (b) of FIG. 3, control for turning the SSC function on and off cannot be carried out. That is, the modulation triangular wave of FIG. 7 is repeated. Further, in the conventional SSCG apparatus of FIG. 5, the frequency at output terminal 2 suddenly undergoes a discontinuous transition from the prevailing modulation frequency to the maximum modulation frequency (the frequency 1.5 GHz of the input clock signal) in accordance with a transition from the high to the low level of the SSC control signal at time t9, as illustrated in (c) of FIG. 3. By contrast, in accordance with the present invention as illustrated in (d) of FIG. 3, the counting operation control signal 32 is held at a high level (logical "1") until both count values from counters 22, 23 take on the initial values of zero, and transitions to the low level at time t10, where the counting operation of the counter 22 is disabled. At the moment the modulation waveform reaches the maximum modulation frequency of 1.5 GHz, the counters 22, 23 stop operating and, as illustrated in (e) of FIG. 3, it will be understood that the output clock signal makes a smooth transition to 1.5 GHz (the frequency when the SSC function is OFF). When the SSC function changes from OFF to ON, the p-counter 22 and up/down counter 23 start counting from the initial values of zero and frequency undergoes a smooth transition.

More specifically, when the SSC control terminal 8 becomes logical "1" (at time t1), frequency modulation starts being carried out immediately. At the moment the degree of frequency modulation is not 0 ppm (at time t9), the counting operation is not halted immediately even if the signal that is supplied to the SSC control terminal 8 is at logical "0". At the moment the degree of frequency modulation is 0 ppm, i.e., at the moment the counters 22 and 23 have returned to their initial values of zero, the counting operation control signal 32 becomes logical "0", counting is disabled and frequency modulation is halted.

The SSC function is changed over between ON and OFF by the enabling and disabling of counter 22. When counting is disabled, the counters 22 and 23 return to their initial values, after which operation is halted. As a result, the transition between ON and OFF can be performed smoothly.

A second example of the present invention will now be described. FIG. 2 is a block diagram illustrating the configuration of the second example. As shown in FIG. 2, this example may be constructed by providing the clock control circuit 41 in front of the p-counter 22. In a manner similar to that of the counting operation control circuit 31, the clock control circuit 41 receives as inputs the signal applied to the SSC control terminal 8, the count value 26 from p-counter 22 and the count value 27 from up/down counter 23. The clock control circuit 41 halts the supply of clock signal 42 (the frequency-divided clock signal that is output from the preliminary frequency divider) only when the count values of counters 22 and 23 are the initial values and, moreover, the SSC control terminal 8 is at logical "0".

In this example, the provision of the clock control circuit 41 makes it possible to halt the clock signal 42 for the counting operation. In comparison with the first example of FIG. 1, therefore, it is possible to reduce unnecessary power consumption when the SSC function is OFF.

Figure 8:
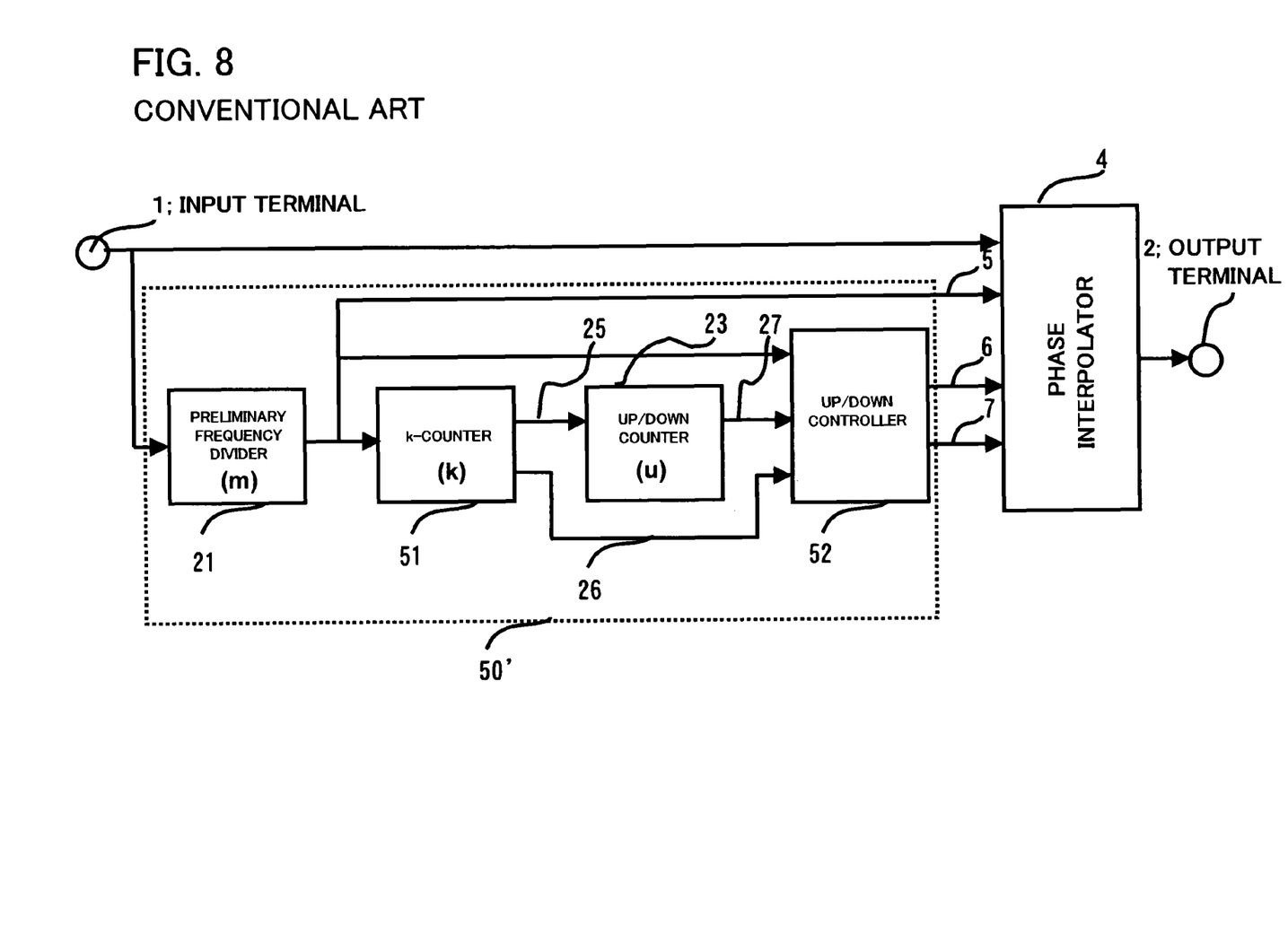
FIG. 8 is a block diagram illustrating the configuration of a first example in Patent Document 1.

A third example of the present invention will be described next. FIG. 8 is a block diagram illustrating the configuration of a first example in Patent Document 1. In the example depicted in FIG. 8, an up/down controller 52 in an SSC controller 50' generates phase-advancing up signal 7 and phase-retarding down signal 6 based upon count values in counters 51 and 23.

Figure 4:
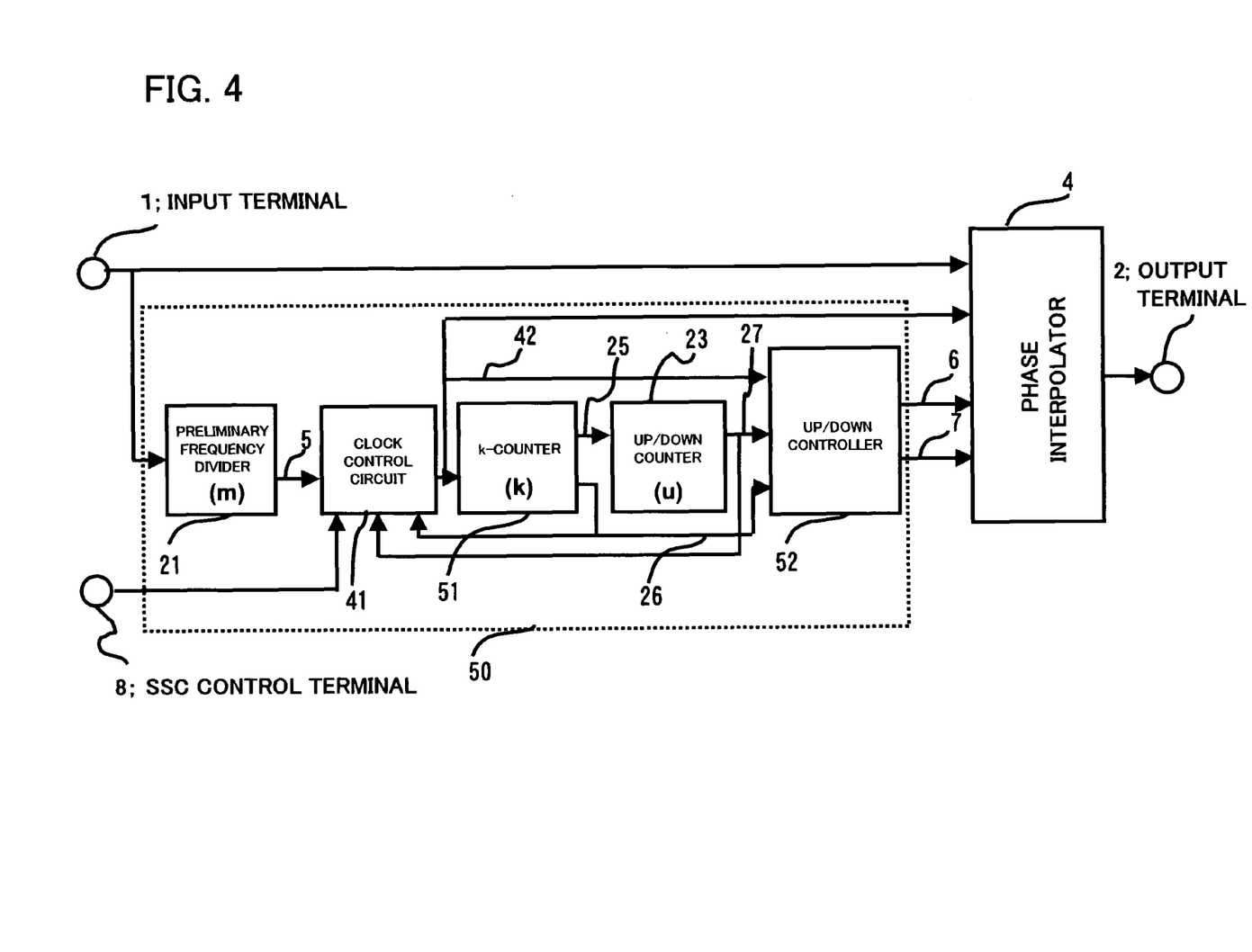
FIG. 4 is a block diagram illustrating the configuration of a third example according to the present invention.

FIG. 4 is a block diagram illustrating the configuration of a third example according to the present invention. This example is the result of applying the present invention to the configuration of FIG. 8. As illustrated in FIG. 4, an SSC controller 50 has the clock control circuit 41, which is constructed and functions as described in the second example, provided in front of k-counter 51.

Furthermore, an arrangement in which the counting operation control circuit 31 of FIG. 1 is provided instead of the clock control circuit 41 of FIG. 4 may be adopted as a fourth example of the present invention.

Thus, in accordance with the examples, control can be exercised to turn an SSC-function on and off, and a transition between the ON and OFF states can be performed smoothly without a transient change in frequency. In each of the foregoing examples, the phase interpolator 4 can be the interpolator constructed as set forth in Patent Document 1 but can also be any circuit that shifts phase based upon a control signal.

Though the present invention has been described in accordance with the foregoing examples, the invention is not limited to this example and it goes without saying that the invention covers various modifications and changes that would be obvious to those skilled in the art within the scope of the claims.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A spread spectrum clock control apparatus for exercising control to supply a phase control signal to a phase interpolator that receives an input clock signal and varies the phase of an output clock signal thereof in accordance with the phase control signal, and to frequency-modulate the output clock signal of said phase interpolator, said apparatus comprising;
   a counter that receives the input clock signal and counts the input clock signal;
   a circuit that generates the phase control signal based upon result of the count; and
   a counting operation control circuit that receives a control signal, which is for turning an SSC (Spread Spectrum Clock) function ON and OFF, and exercises control so as to enable the counting operation by the counter if the control signal indicates SSC-function ON, and disable the counting operation of the counter at the moment a count value in the counter reaches a predetermined value when the control signal has become a value indicating SSC-function OFF, wherein said counting operation control circuit performs control for halting supply of the clock signal to the counter at the moment the count value in the counter reaches a predetermined value when the control signal has become the value indicating SSC-function OFF.

2. The apparatus according to claim 1, wherein the phase control signal includes a down signal that retards the phase of the output clock signal.

3. The apparatus according to claim 1, wherein the phase control signal includes a down signal that retards the phase of the output clock signal and/or an up signal that advances the phase of the output clock signal.

4. A spread spectrum clock generating apparatus comprising the spread spectrum control clock apparatus according to claim 1, and further comprising:
a phase interpolator receiving an input clock signal and varying the phase of an output clock signal in accordance with a phase control signal, wherein the spread spectrum clock control apparatus is for exercising control to supply the phase control signal to said phase interpolator and to frequency-modulate the output clock signal.

5. A spread spectrum clock control apparatus for exercising control to supply a phase control signal to a phase interpolator that receives an input clock signal and varies the phase of an output clock signal thereof in accordance with the phase control signal, and to frequency-modulate the output clock signal of said phase interpolator, said apparatus comprising:
a counting operation control circuit that outputs a counting operation control signal for controlling count enable and disable;
a first counter that, when the counting operation control signal from said counting operation control circuit indicates count enable, receives and counts the input clock signal and, when the signal has been counted up to a predetermined first value, outputs a first output signal and sets the count of the counter to an initial value, and that, when the counting operation control signal indicates count disable, halts the counting operation;
a second counter that receives the first output signal from said first counter, and counts the first output signal up and down between a predetermined initial value and a predetermined second value; and
a controller that outputs the phase control signal to said phase interpolator based upon count values from said first and second counters;
wherein the counting operation control circuit receives a control signal for on/off controlling an SSC (spread spectrum clock) function as well as the count values from said first and second counters, sets the counting operation control signal to a value indicating count disable, when the control signal indicates SSC-function OFF and when both of the count values from said first and second counters are initial values, and sets the counting operation control signal to a value indicating count enable at all other times.

6. The apparatus according to claim 5, further comprising a frequency divider circuit that receives the input clock signal, said frequency divider circuit being arranged in front of said first counter and supplying a frequency-divided clock signal to said first counter.

7. The apparatus according to claim 6, wherein said controller receives the frequency-divided clock from said frequency divider circuit and the count values from said first and second counters as inputs, and outputs the phase control signal to said phase interpolator based upon the count values from said first and second counters at a timing stipulated by the frequency-divided clock.

8. The apparatus according to claim 5, wherein the phase control signal includes a down signal that retards the phase of the output clock signal.

9. The apparatus according to claim 5, wherein the phase control signal includes a down signal that retards the phase of the output clock signal and/or an up signal that advances the phase of the output clock signal.

10. A spread spectrum clock generating apparatus comprising the spread spectrum control clock apparatus according to claim 5, and further comprising:
a phase interpolator receiving an input clock signal and varying the phase of an output clock signal in accordance with a phase control signal, wherein the spread spectrum clock control apparatus is for exercising control to supply the phase control signal to said phase interpolator and to frequency-modulate the output clock signal.

11. A spread spectrum clock control apparatus for exercising control to supply a phase control signal to a phase interpolator which receives an input clock signal and varies the phase of an output clock signal thereof in accordance with the phase control signal, and to frequency-modulate the output clock signal of said phase interpolator, said apparatus comprising:
a first counter that receives and counts the input clock signal and, when the signal has been counted up to a predetermined first value, outputs a first output signal and sets the count to an initial value;
a second counter that receives the first output signal from said first counter, and counts the first output signal up and down between a predetermined initial value and a predetermined second value;
a controller that outputs the phase control signal to said phase interpolator based upon count values from said first and second counters; and
a clock control circuit that controls supply and halting of the clock signal to said first counter;
wherein said clock control circuit receives a control signal for on/off controlling an SSC (spread spectrum clock) function as well as the count values from said first and second counters, and exercises control so as to halt supply of the clock signal to said first counter, when the control signal indicates SSC-function OFF and when both of the count values from said first and second counters are initial values, and to supply the clock signal to said first counter at all other times.

12. The apparatus according to claim 11, further comprising a frequency divider circuit that receives the input clock signal, said frequency divider circuit being arranged in front of said clock control circuit and supplying a frequency-divided clock signal to said clock control circuit;
said clock control circuit halting supply of the frequency-divided clock signal to said first counter when the control signal indicates SSC-function OFF and, moreover, both of the count values from said first and second counters are initial values, and supplying the frequency-divided clock signal to said first counter at all other times.

13. The apparatus according to claim 12, wherein said controller receives the frequency-divided clock from said frequency divider circuit and the count values from said first and second counters as inputs, and outputs the phase control signal to said phase interpolator based upon the count values from said first and second counters at a timing stipulated by the frequency-divided clock.

14. The apparatus according to claim 11, wherein the phase control signal includes a down signal that retards the phase of the output clock signal.

15. The apparatus according to claim 11, wherein the phase control signal includes a down signal that retards the phase of the output clock signal and/or an up signal that advances the phase of the output clock signal.

16. A spread spectrum clock generating apparatus comprising the spread spectrum control clock apparatus according to claim 11, and further comprising:
a phase interpolator receiving an input clock signal and varying the phase of an output clock signal in accordance with a phase control signal, wherein the spread spectrum clock control apparatus is for exercising control to supply the phase control signal to said phase interpolator and to frequency-modulate the output clock signal.

* * * * *